United States Patent
Takeo et al.

(10) Patent No.: US 6,563,942 B2
(45) Date of Patent: *May 13, 2003

(54) METHOD FOR ADJUSTING POSITIONS OF RADIATION IMAGES

(75) Inventors: Hideya Takeo, Kanagawa-ken (JP); Nobuyoshi Nakajima, Kanagawa-ken (JP)

(73) Assignee: Fuji Photo Film Co., Ltd., Kanagawa (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/397,639

(22) Filed: Mar. 2, 1995

(65) Prior Publication Data

US 2003/0012456 A1 Jan. 16, 2003

(30) Foreign Application Priority Data

Mar. 7, 1994 (JP) .................................................. 6-35850

(51) Int. Cl.⁷ ................................................. G06K 9/00
(52) U.S. Cl. ........................ 382/132; 382/209; 382/294
(58) Field of Search .............................. 382/130, 132, 382/294, 209, 260, 293

(56) References Cited

U.S. PATENT DOCUMENTS

| | | | |
|---|---|---|---|
| 4,356,398 A | * 10/1982 | Komaki et al. | 250/327.2 |
| 4,636,953 A | * 1/1987 | Kageyama | 382/132 |
| 4,644,582 A | * 2/1987 | Morishita et al. | 382/130 |
| 4,710,875 A | 12/1987 | Nakajima et al. | 364/414 |
| 4,851,984 A | * 7/1989 | Doi et al. | 382/132 |
| 5,063,604 A | * 11/1991 | Weiman | 382/293 |
| 5,359,513 A | * 10/1994 | Kano et al. | 382/130 |
| 5,469,274 A | * 11/1995 | Iwasaki et al. | 382/294 |
| 5,495,535 A | * 2/1996 | Smilansky et al. | 382/294 |
| 5,495,540 A | * 2/1996 | Frankot et al. | 382/294 |

FOREIGN PATENT DOCUMENTS

EP 0599345 6/1994 ........... G06F/15/70

OTHER PUBLICATIONS

Smith et al., Automated Cloud Tracking Using Precisely Aligned Digital ATS Pictures, 7/72, 715–729, IEEE.*
Barnea et al, A Class of Algorithms for Fast Digital Image Registration, 2/72, 179–186.*
A. Semino et al., "Image Registration by a Region–Based Approach and by Correction of Elastic Deformations", Signal Processing VI Theories and Applications, Brussels, Aug. 24–27, 1992, vol. 3., Conf. 6, Aug. 1992, pps. 1441–1444.
"Automated Cloud Tracking Using Precisely Aligned Digital ATS Pictures" Smith et al vol. c–21, pp. 715–729, Jul. 1972.
" A Class of Algorithims for Fast Digital Image Registration" Barnea, et al., IEEE Trans. vol. c–21, pp. 179–186, Feb. 1972.

* cited by examiner

Primary Examiner—Timothy M. Johnson
(74) Attorney, Agent, or Firm—Sughrue Mion, PLLC

(57) ABSTRACT

Template regions are set on a single radiation image, among a plurality of radiation images. Template matching is carried out, with which the template regions are matched with the radiation images other than the single radiation image. At least three corresponding points are thereby obtained in each of the radiation images. The corresponding points in a single radiation image, among the plurality of radiation images, are taken as reference corresponding points, and factors of affine transformation are calculated with the method of least squares. Affine transformation is then carried out using the calculated factors of affine transformation. The values of coordinates of the corresponding points in the radiation images other than the single radiation image having the reference corresponding points are thus transformed into values of coordinates of the reference corresponding points such that the reference corresponding points and the corresponding points coincide with one another.

5 Claims, 8 Drawing Sheets

F I G. 6
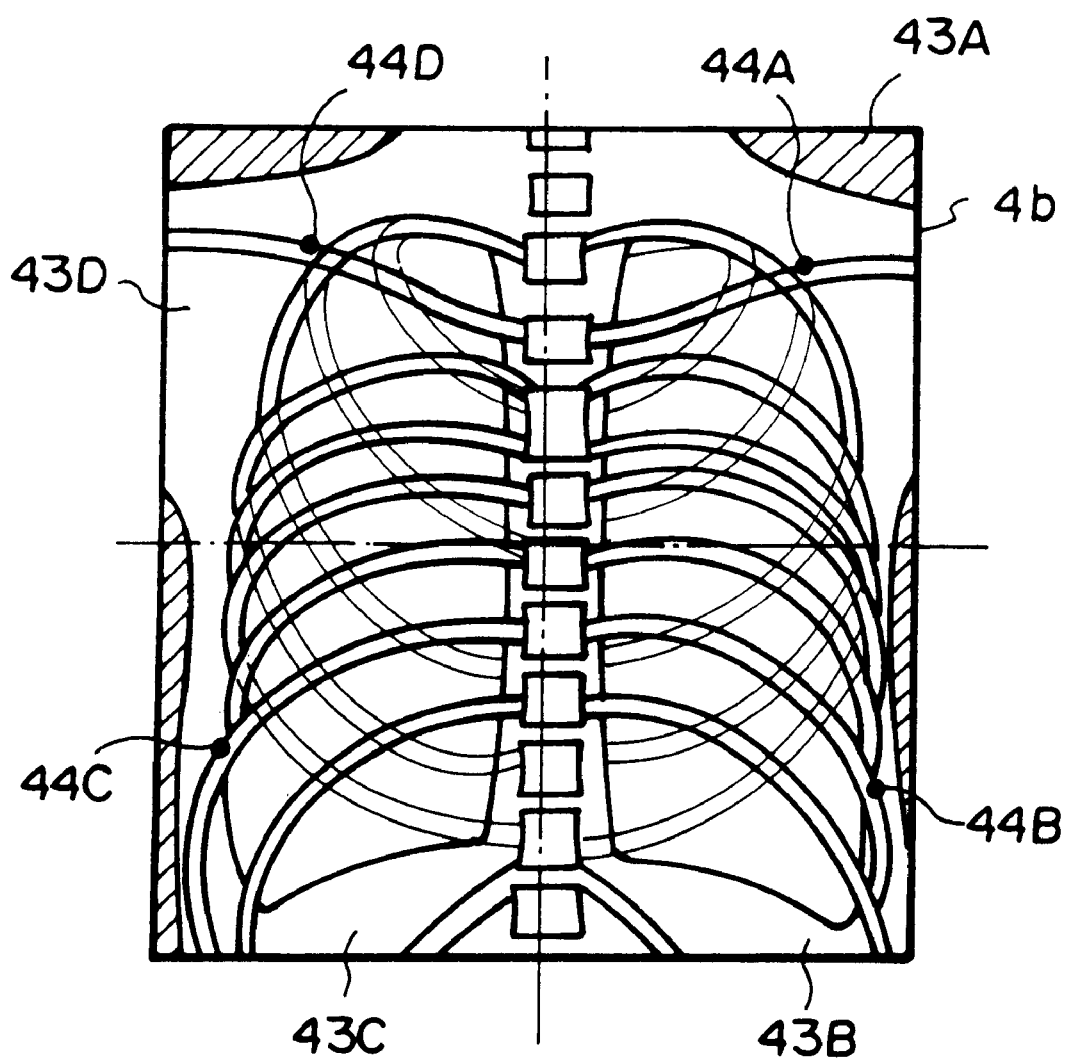

METHOD FOR ADJUSTING POSITIONS OF RADIATION IMAGES

BACKGROUND OF THE INVENTION

1. Field of the Invention

This invention relates to a method for adjusting positions of a plurality of radiation images, which are to be subjected to superposition processing or subtraction processing, by eliminating shifts in positions among the radiation images. This invention particularly relates to a method for adjusting positions of radiation images, wherein image patterns of a marker for position adjustment need not be embedded in the radiation images.

2. Description of the Prior Art

It has heretofore been proposed to use stimulable phosphors in radiation image recording and reproducing systems. Specifically, a sheet provided with a layer of the stimulable phosphor (hereinafter referred to as a stimulable phosphor sheet) is first exposed to radiation, which carries image information of an object, such as a human body. In this manner, a radiation image of the object is stored on the stimulable phosphor sheet. The stimulable phosphor sheet, on which the radiation image has been stored, is then exposed to stimulating rays, which cause it to emit light in proportion to the amount of energy stored thereon during its exposure to the radiation. The light emitted by the stimulable phosphor sheet, when it is exposed to the stimulating rays, is photoelectrically detected and converted into an electric image signal. The electric image signal is then processed, and the processed image signal is then used during the reproduction of a visible image, which has good image quality and can serve as an effective tool in, particularly, the efficient and accurate diagnosis of an illness. The visible image finally obtained may be reproduced in the form of a hard copy or may be displayed on a display device, such as a cathode ray tube (CRT) display device.

Techniques for carrying out superposition processing on radiation images have heretofore been disclosed in, for example, U.S. Pat. No. 4,356,398. In general, radiation images are used for diagnoses of illnesses and for other purposes. When a radiation image is used for such purposes, it is required that even small differences in the radiation energy absorption characteristics among structures of an object can be detected accurately in the radiation image. The extent, to which such differences in the radiation energy absorption characteristics can be detected in a radiation image, is referred to as the contrast detection performance or simply as the detection performance. A radiation image having better detection performance has better image quality and can serve as a more effective tool in, particularly, the efficient and accurate diagnosis of an illness. Therefore, in order for the image quality to be improved, it is desirable that the detection performance of the radiation image may be improved. The detection performance is adversely affected by various noises.

Superposition processing is carried out in order to reduce the aforesaid noises markedly so that even small differences in the radiation energy absorption characteristics among structures of an object can be found accurately in a visible radiation image, which is reproduced finally, i.e. the detection performance of the radiation image can be improved markedly. Specifically, a radiation image is stored on each of a plurality of stimulable phosphor sheets, which have been placed one upon another. Thereafter, an image read-out operation is carried out for each of the stimulable phosphor sheets. A plurality of image signals, which have been obtained from the image read-out operations, are added to one another. In this manner, various noises described above can be reduced.

By way of example, when superposition processing is to be carried out, two stimulable phosphor sheets have heretofore been housed in a cassette such that they may overlap one upon the other. Radiation images of an object are then recorded on the two stimulable phosphor sheets housed in the cassette. Thereafter, an image read-out operation is carried out on each of the two stimulable phosphor sheets, and two image signals are thereby obtained. The two image signals are then added to each other.

Also, techniques for carrying out subtraction processing on radiation images have heretofore been known. When subtraction processing is to be carried out, two radiation images recorded under different conditions are photoelectrically read out, and digital image signals which represent the radiation images are thereby obtained. The image signal components of the digital image signals, which represent corresponding picture elements in the radiation images, are then subtracted from each other, and a difference signal is thereby obtained which represents the image of a specific structure or part of the object represented by the radiation images. With the subtraction processing method, two digital image signals are subtracted from each other in order to obtain a difference signal, and the radiation image of a specific structure can be reproduced from the difference signal.

Basically, subtraction processing is carried out with either the so-called temporal (time difference) subtraction processing method or the so-called energy subtraction processing method. In the former method, in order to extract the image of a specific structure of an object from the image of the entire object, the image signal representing a radiation image obtained without injection of contrast media is subtracted from the image signal representing a radiation image in which the image of the specific structure of the object is enhanced by the injection of contrast media. In the latter method, an object is exposed to several kinds of radiation having different energy distributions. Alternatively, the energy distribution of the radiation carrying image information of an object, is changed after it has been irradiated onto one of at least two radiation image recording media, after which the radiation impinges upon the second radiation image recording medium. In this manner, at least two radiation images, in which different images of a specific structure of the object are embedded, are obtained. Thereafter, the image signals representing at least two radiation images are weighted appropriately, when necessary, and subjected to a subtraction process, and the image of the specific structure of the object is thereby extracted.

Subtraction processing is extremely effective, particularly for medical diagnosis, and electronics research has continued to develop improved subtraction processing methods.

However, the problems described below are encountered in the superposition processing and the subtraction processing of radiation images, wherein stimulable phosphor sheets are utilized.

Specifically, when each of the superposition processing method and the subtraction processing method utilizing the stimulable phosphor sheets is to be carried out, at least two stimulable phosphor sheets are inserted into an image recording apparatus one after the other or simultaneously, and radiation images to be subjected to the superposition processing or the subtraction processing are recorded on the stimulable phosphor sheets. Thereafter, each of the stimulable phosphor sheets is inserted into an image read-out apparatus and exposed to stimulating rays, which cause the stimulable phosphor sheet to emit light in proportion to the amount of energy stored thereon during its exposure to the radiation. The light emitted by each stimulable phosphor sheet is detected, and the radiation image stored on the stimulable phosphor sheet is thereby read out. In such cases, even if the operations for recording and reading out the radiation images are carried out very carefully, a shift and a rotation will occur between the images to be subjected to the superposition processing or the subtraction processing. As a result, in the superposition processing, even if various noises are averaged and reduced, the entire area of the superposition image, which is obtained from the superposition processing, particularly edges of a structure in the superposition image, will become unsharp. Therefore, a superposition image cannot be obtained which has good image quality and can serve as an effective tool in, particularly, the efficient and accurate diagnosis of an illness. Also, in the subtraction processing, as a result of the shift and the rotation occurring between the images to be subjected to the subtraction processing, an image pattern to be erased in a subtraction image, which is obtained from the subtraction processing, cannot be erased. Alternatively, an image pattern to be formed in the subtraction image will be erased, and an artifact will occur. Therefore, an accurate subtraction image cannot be obtained. In this manner, the shift and the rotation occurring between the images to be subjected to the superposition processing or the subtraction processing adversely affect the image quality of the image obtained from the superposition processing or the subtraction processing.

The radiation image is stored as a latent image on the stimulable phosphor sheet and cannot be viewed directly like an X-ray image recorded as a visible image on X-ray photographic film. Therefore, the positions of two or more radiation images stored on the stimulable phosphor sheets cannot be visually matched to each other. Accordingly, if the shift and the rotation occur between the radiation images stored on the stimulable phosphor sheets, the shift and the rotation cannot be eliminated easily.

Also, even if the shift and the rotation between two radiation images can be detected by some means, considerable time will be required for conventional operations to be carried out in order to correct the image signals detected from the radiation images, particularly in order to eliminate the rotation between the radiation images. This is a very real problem in practical use.

In U.S. Pat. No. 4,710,875, the applicant proposed a subtraction processing method for radiation images, wherein a marker having a shape such that it may provide a reference point or a reference line is utilized. With the proposed method, image patterns of the marker are recorded on two stimulable phosphor sheets such that the patterns of the marker may be located at positions fixed with respect to radiation images stored on the stimulable phosphor sheets. When the radiation images are read out from the stimulable phosphor sheets, the patterns of the marker are detected. The amounts of a shift and a rotation between the two radiation images are then calculated with reference to the patterns of the marker. Thereafter, either one of the radiation images to be subjected to subtraction processing is digitally rotated and/or translated in accordance with the calculated amount of the rotation and/or the calculated amount of the shift. The image signal components of the image signals, which represent corresponding picture elements in the radiation images, are then subtracted from each other. The position adjusting step, which is carried out in the subtraction processing method for radiation images utilizing the marker, can also be applied to the aforesaid superposition processing method. In such cases, after the positions of the radiation images are digitally matched to each other, the image signal components of the image signals, which represent corresponding picture elements in the radiation images, may be added to each other.

However, with the proposed method, each time a radiation image of an object is recorded on a stimulable phosphor sheet, the pattern of the marker must be recorded together with the object image on the stimulable phosphor sheet. Also, the problems occur in that the image information of the object cannot be obtained from the portion of the radiation image stored on the stimulable phosphor sheet, which portion overlaps upon the position of the pattern of the marker.

Accordingly, in U.S. patent application Ser. No. 08/158, 875 (see U.S. Pat. No. 5,623,560), the applicant proposed a method for adjusting positions of radiation images, wherein a marker, or the like, need not be used for position adjustment. The proposed method comprises the steps of (a) setting template regions on one of a plurality of radiation images, the positions of which are to be adjusted, (b) carrying out template matching on the other radiation images by using the template regions, (c) thereby obtaining at least two corresponding points in each of the plurality of the radiation images, and (d) carrying out affine transformation on the corresponding points such that the corresponding points in the plurality of the radiation images may coincide with one another. With the affine transformation, the correction with the rotating operation, the correction with the enlargement or reduction factor, and the correction with the parallel translation are carried out on the plurality of the radiation images.

With the proposed method for adjusting positions of radiation images, an image pattern of a marker, or the like, need not be recorded for position adjustment together with an object image in each of radiation images, and the positions of radiation images can be quickly and accurately matched to each other.

However, for example, as illustrated in FIG. 10 which is an explanatory view showing shift between radiation images, it often occurs that errors $\Delta A$ and $\Delta B$ of points A and B, which are among three corresponding points A, B, and C, with respect to reference corresponding points are small, and an error $\Delta C$ of the point C, which is located at a position spaced far apart from the points A and B, with respect to a reference corresponding point is large. In such cases, if only two points A and B are obtained as the corresponding points, which are to be subjected to the affine transformation, the point C will not be transformed with the affine transformation. Therefore, the error $\Delta C$ remains large, and an accurate position adjustment cannot be carried out. Also, the error $\Delta C$ of the point C is larger than the errors $\Delta A$ and $\Delta B$ of points A and B. Therefore, with the aforesaid method for adjusting positions of radiation images, the errors of the respective points cannot be compensated for uniformly during the affine transformation, and the position adjustment cannot be carried out accurately.

FIG. 8 is a graph showing the results of position adjustments carried out with a conventional method for adjusting positions of radiation images. In FIG. 8, the sum $|R|$ of the magnitudes of the vectors of the aforesaid errors (error vectors) is plotted on the horizontal axis, and the maximum value max |Ri| of the error vectors is plotted on the vertical axis. Also, in FIG. 8, the results of the position adjustments carried out on 55 sets of radiation images are shown. By way of example, as illustrated in FIG. 8, with the aforesaid method for adjusting positions of radiation images, in cases where the reference vector is taken as |R|=4.5 and max|Ri|= 1.00, the results of the position adjustments on 10 sets of radiation images did not fall within the range of the reference level.

SUMMARY OF THE INVENTION

The primary object of the present invention is to provide a method for adjusting positions of radiation images, wherein a marker, or the like, need not be used for position adjustment.

Another object of the present invention is to provide a method for adjusting positions of radiation images, wherein the positions of radiation images can be quickly and accurately matched to each other.

The present invention provides a first method for adjusting positions of radiation images, wherein the positions of a plurality of radiation images are matched to one another such that the radiation images may be subjected to superposition processing or subtraction processing, the method comprising the steps of:
i) setting template regions on a single radiation image, which is among the plurality of the radiation images,
ii) carrying out template matching, with which the template regions are matched with the radiation images other than the single radiation image,
iii) thereby obtaining at least three corresponding points in each of the plurality of the radiation images,
iv) taking the corresponding points in a single radiation image, which is among the plurality of the radiation images, as reference corresponding points,
v) calculating factors of affine transformation with the method of least squares, the affine transformation being represented by the formula $$\begin{pmatrix} u \\ v \end{pmatrix} = \begin{pmatrix} a & b \\ c & d \end{pmatrix} \begin{pmatrix} x \\ y \end{pmatrix} + \begin{pmatrix} e \\ f \end{pmatrix}$$

wherein u and v represent the coordinates of the reference corresponding point, x and y represents the coordinates of the corresponding point to be transformed, a, b, c, and d are the factors representing correction with a rotating operation and correction with an enlargement or reduction factor, and e and f are the factors representing correction with parallel translation, and
vi) carrying out affine transformation, in which the calculated factors of affine transformation are used, and with which the values of coordinates of the corresponding points in the radiation images other than the single radiation image having the reference corresponding points are transformed into values of coordinates of the reference corresponding points such that the reference corresponding points and the corresponding points in the radiation images other than the single radiation image having the reference corresponding points may coincide with one another.

The present invention also provides a second method for adjusting positions of radiation images, wherein the first method for adjusting positions of radiation images in accordance with the present invention is modified such that the plurality of the radiation images are obtained by exposing a plurality of stimulable phosphor sheets superposed one upon another to radiation, which has been produced by a radiation source and has passed through an object, thereby storing a radiation image of the object on each of the stimulable phosphor sheets, thereafter exposing each of the stimulable phosphor sheets to stimulating rays, which cause the stimulable phosphor sheet to emit light in proportion to the amount of energy stored thereon during its exposure to the radiation, and photoelectrically detecting the emitted light, and the radiation image, which has been obtained from the stimulable phosphor sheet located at the position closest to the radiation source, is taken as the radiation image, in which the reference corresponding points are to be set.

With the template matching, in cases where the template regions are set in a single radiation image in the manner described above, the template regions are moved on the other radiation image, and the locations, which best match to the template regions, are thereby found. The points representing the locations which have thus been found give the coordinates of the corresponding points.

The degree of matching in the template matching may be evaluated with a correlation method or sequential similarity detection algorithms (hereinafter referred to as SSDA).

With the correlation method, the product of image signal components, which represent corresponding picture elements in the corresponding regions on the radiation images, is calculated. The sum of the products, which have thus been calculated for the picture elements in the corresponding regions on the radiation images, is then normalized, and the value obtained from the normalization (hereinafter referred to as the normalized value) is taken as the grade of superposition. During the normalization, the product (the square) of the image signal component, which represents each picture element in each region, is calculated, and the sum of the products, which have thus been calculated for the picture elements in each region, is then calculated. Thereafter, the product of the sums, which have thus been calculated for the corresponding regions on the radiation images, is calculated. The square root of the product, which has thus been obtained, is taken as the denominator for the aforesaid sum of the products of image signal components, which represent corresponding picture elements in the corresponding regions on the radiation images. In cases where the corresponding regions are completely superposed one upon the other, the product of the image signal components, which represent corresponding picture elements in the corresponding regions on the radiation images, may not become equal to the square of each of these image signal components due to noise, or the like, and therefore the normalized value may not become equal to 1. However, in such cases, the normalized value will take the maximum value which is closest to 1. Therefore, the template regions may be moved in various ways on the radiation image. When the template regions have been moved such that the aforesaid normalized value may become maximum, it may be considered that the superposition of the corresponding regions on the radiation images have been accomplished. However, the judgment as to whether the template regions have been or have not been moved such that the aforesaid normalized value may become maximum can be made only after all of the movements have been carried out. The correlation method is described in detail in, for example, "Automated Cloud Tracking Using Precisely Aligned Digital ATS Pictures" by Smith, et al., ibid., Vol. c-21, pages 715–729, July 1972.

With the SSDA, the difference between the image signal components, which represent corresponding picture elements in the corresponding regions on the radiation images, is calculated. The sum of the absolute values of the differences, which have thus been calculated for the picture elements in the corresponding regions on the radiation images, is taken as the grade of superposition. In cases where the corresponding regions are completely superposed one upon the other, even if the sum (the residual) does not become equal to 0 due to noise, or the like, the residual will become minimum. Therefore, the template regions may be moved in various ways on the radiation image. When the template regions have been moved such that the residual may become minimum, it may be considered that the superposition of the corresponding regions on the radiation images have been accomplished. If the positions of the corresponding regions on the radiation images shift from each other, the residual will increase sharply during the addition of the absolute values of the differences between the image signal components, which represent corresponding picture elements in the corresponding regions on the radiation images. Therefore, with the SSDA, when the residual becomes larger than a certain threshold value during the addition, the addition is ceased, and next movement of the template regions is begun. With the SSDA, only the addition is carried out during the calculation. Also, in many cases, the calculation is ceased before it is carried out for all of the picture elements in the corresponding regions on the radiation images. Therefore, the calculation time can be kept short. The SSDA method is described in detail in, for example, "A Class of Algorithms for Fast Digital Image Registration" by Barnea, et al., IEEE. Trans., Vol. c-21, pages 179–186, February 1972.

With the method for adjusting positions of radiation images in accordance with the present invention, at least three corresponding points are obtained in each of the plurality of the radiation images by carrying out the template matching. Therefore, the accuracy of the position adjustment can be kept higher than with the conventional method wherein the positions of two corresponding points are matched to each other. Also, the coordinates of the corresponding points are transformed into the coordinates of the reference corresponding points by carrying out the affine transformation wherein the factors of affine transformation calculated with the method of least squares are used. Therefore, the corresponding points in each image are transformed such that the error between every corresponding point in each image and the reference corresponding point may become smallest. Further, with the method for adjusting positions of radiation images in accordance with the present invention, the factors of affine transformation are calculated with the method of least squares. Therefore, even if the number of the corresponding points becomes large, every corresponding point can be transformed so as to become closer to the reference corresponding point.

When the affine transformation is carried out on a radiation image in the manner described above, the image quality of the transformed radiation image becomes bad to some extent due to interpolation of image signal components. Also, in cases where a plurality of radiation images are recorded on a plurality of stimulable phosphor sheets with a single, simultaneous exposure to the radiation (i.e., with the one-shot image recording operation), the image quality of the radiation image recorded on a stimulable phosphor sheet, which is located at a position remoter from the radiation source, becomes worse due to effects of scattered radiation, or the like. Therefore, in cases where a plurality of radiation images are recorded on a plurality of stimulable phosphor sheets with the one-shot image recording operation, and the radiation image, which has been obtained from the stimulable phosphor sheet located at the position closest to the radiation source, is taken as the radiation image, in which the reference corresponding points are to be set, the position adjustment can be carried out accurately while the image quality of the radiation image, which has been obtained from a stimulable phosphor sheet located at the position close to the radiation source, is being kept good.

As described above, with the method for adjusting positions of radiation images in accordance with the present invention, a marker, or the like, need not be used for position adjustment, and the positions of radiation images can be quickly and accurately matched to each other.

BRIEF DESCRIPTION OF THE DRAWINGS

FIG. 6 is an explanatory view showing how corresponding points are set in the other radiation image.

DESCRIPTION OF THE PREFERRED EMBODIMENTS

The present invention will hereinbelow be described in further detail with reference to the accompanying drawings.

Figure 1:
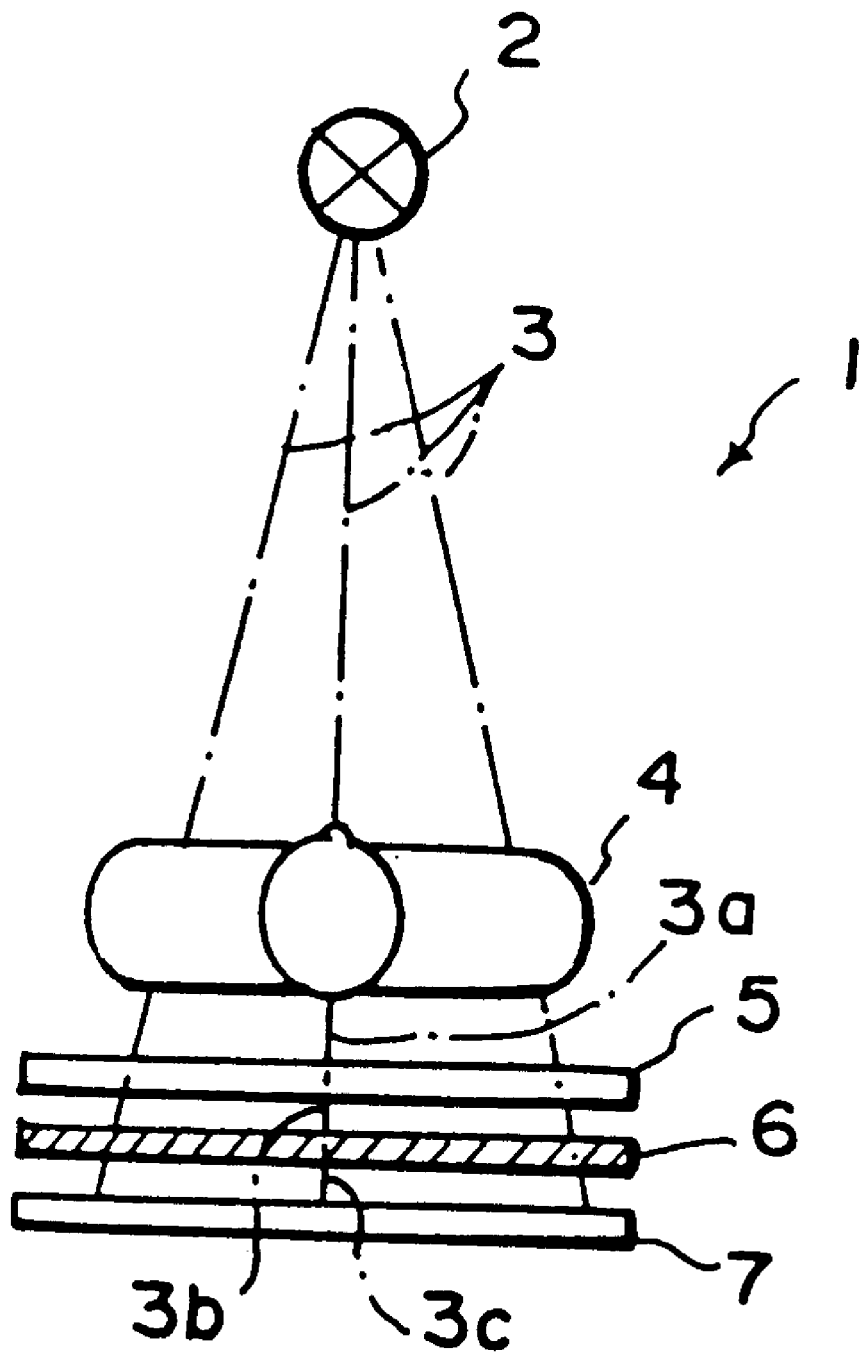
FIG. 1 is a schematic view showing a radiation image recording apparatus for obtaining radiation images to be subjected to subtraction processing.

FIG. 1 is a schematic view showing a radiation image recording apparatus 1, which is an example of an apparatus for recording radiation images to be used in the present invention. In this embodiment, the radiation images recorded by the radiation image recording apparatus 1 are utilized during energy subtraction processing.

A first stimulable phosphor sheet 5 is placed upon a second stimulable phosphor sheet 7 with a filter 6 intervening therebetween. An object 4 lies above the first stimulable phosphor sheet 5, and a radiation source 2 for producing radiation 3 is located above the object 4. The radiation image recording apparatus 1 is constituted in this manner.

The radiation 3, which has been produced by the radiation source 2, is irradiated to the object 4. Radiation 3a, which has passed through the object 4, impinge upon the first stimulable phosphor sheet 5, and part of energy from the radiation 3a is stored on the first stimulable phosphor sheet 5. In this manner, a radiation image of the object 4 is stored on the first stimulable phosphor sheet 5. Radiation 3b, which has passed through the first stimulable phosphor sheet 5, then passes through the filter 6. Radiation 3c, which has passed through the filter 6, impinges upon the second stimulable phosphor sheet 7. In this manner, a radiation image of the object 4 is stored on the second stimulable phosphor sheet 7.

Figure 2:
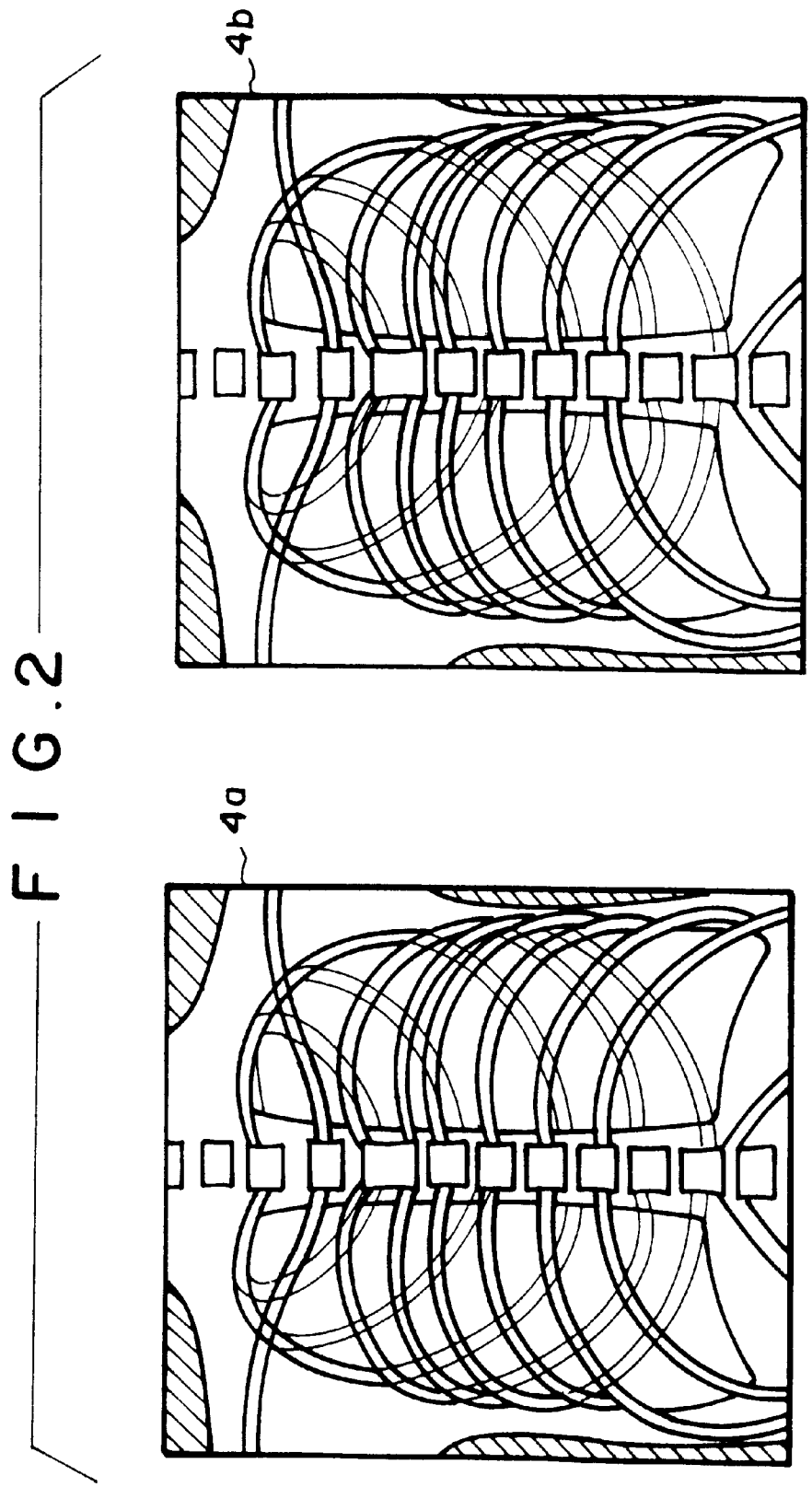
FIG. 2 is an explanatory view showing examples of radiation images stored on stimulable phosphor sheets.

FIG. 2 is an explanatory view showing examples of the radiation images stored on the stimulable phosphor sheets 5 and 7. As illustrated in FIG. 2, radiation images 4a and 4b are respectively stored on approximately entire areas of the stimulable phosphor sheets 5 and 7. Specifically, the radiation image 4a serves as the radiation image obtained from the upper stimulable phosphor sheet 5, and the radiation image 4b serves as the radiation image obtained from the lower stimulable phosphor sheet 7.

Figure 3:
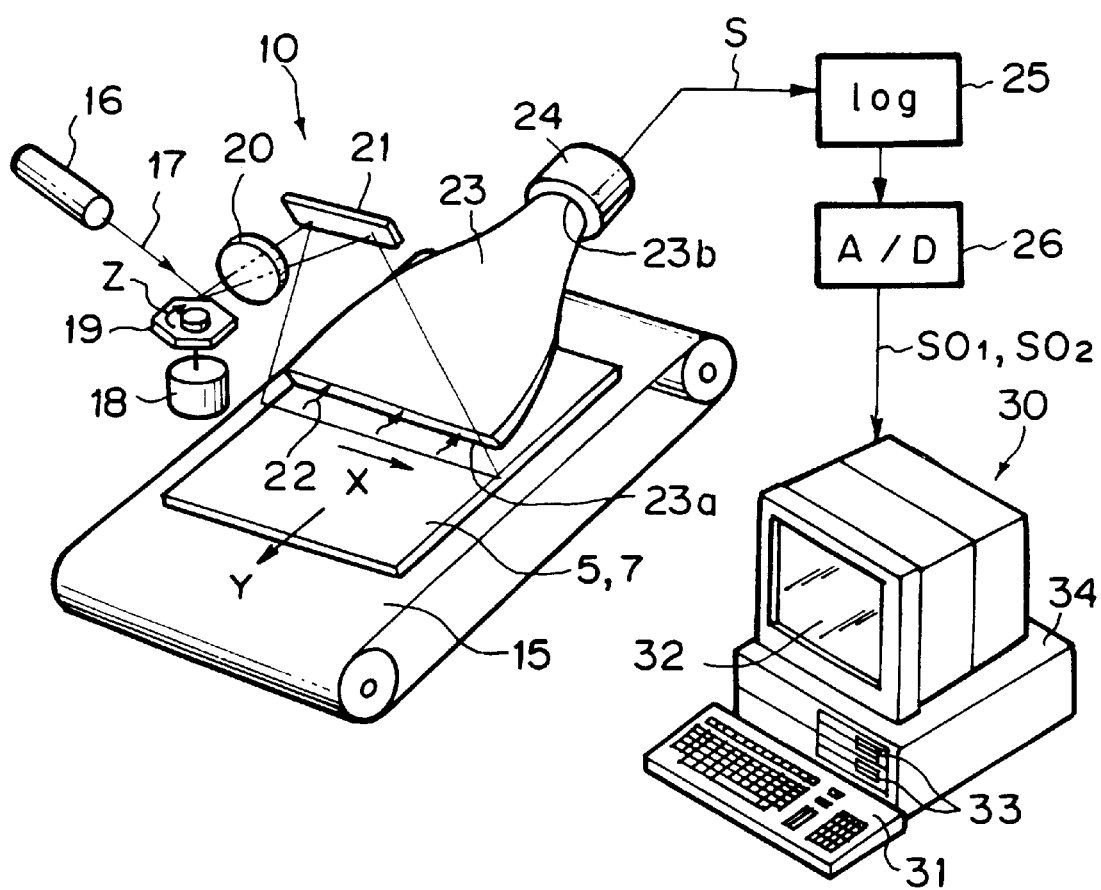
FIG. 3 is a perspective view showing an image read-out apparatus provided with an apparatus for carrying out the method for adjusting positions of radiation images in accordance with the present invention.

FIG. 3 is a perspective view showing a radiation image read-out apparatus 10, which is an example of a read-out unit for reading out a radiation image to be used in an embodiment of the method for adjusting positions of radiation images in accordance with the present invention, and an image processing and displaying apparatus 30, which is an example of an operation unit for carrying out the embodiment of the method in accordance with the present invention and carrying out subtraction processing.

After the first radiation image and the second radiation image have been stored respectively on the first stimulable phosphor sheet 5 and the second stimulable phosphor sheet 7 in the radiation image recording apparatus 1 shown in FIG. 1, the first stimulable phosphor sheet 5 and the second stimulable phosphor sheet 7 are placed one after the other at a predetermined position in the radiation image read-out apparatus 10 shown in FIG. 3. How the first radiation image is read out from the first stimulable phosphor sheet 5 will be described hereinbelow.

With reference to FIG. 3, the first stimulable phosphor sheet 5 is conveyed in a sub-scanning direction indicated by the arrow Y by a sheet conveyance means 15, which is constituted of an endless belt, or the like, and which is operated by an operating means (not shown). A laser beam 17, which serves as stimulating rays, is produced by a laser beam source 16. The laser beam 17 is reflected and deflected by a rotating polygon mirror 19, which is being quickly rotated by a motor 18 in the direction indicated by the arrow Z. The laser beam 17 then passes through a converging lens 20, which may be constituted of an fθ lens, or the like. The direction of the optical path of the laser beam 17 is then changed by a mirror 21, and the laser beam 17 is caused to impinge upon the first stimulable phosphor sheet 5 and scan it in a main scanning direction indicated by the arrow X. The main scanning direction is approximately normal to the sub-scanning direction indicated by the arrow Y. When the first stimulable phosphor sheet 5 is exposed to the laser beam 17, the exposed portion of the first stimulable phosphor sheet 5 emits light 22 in an amount proportional to the amount of energy stored thereon during its exposure to the radiation. The emitted light 22 is guided by a light guide member 23, and photoelectrically detected by a photomultiplier 24. The light guide member 23 is made from a light guiding material, such as an acrylic plate. The light guide member 23 has a linear light input face 23a, positioned to extend along the main scanning line on the first stimulable phosphor sheet 5, and a ring-shaped light output face 23b, positioned so that it is in close contact with a light receiving face of the photomultiplier 24. The emitted light 22, which has entered the light guide member 23 from its light input face 23a, is guided through repeated total reflection inside of the light guide member 23, emanates from the light output face 23b, and is received by the photomultiplier 24. In this manner, the amount of the emitted light 22, which amount represents the first radiation image stored on the first stimulable phosphor sheet 5, is converted into an electric signal by the photomultiplier 24.

An analog signal S generated by the photomultiplier 24 is logarithmically amplified by a logarithmic amplifier 25, and fed into an A/D converter 26. The A/D converter 26 samples the analog signal S, and the sampled signal is converted into a digital image signal SO. The image signal SO thus obtained represents the first radiation image, which was stored on the first stimulable phosphor sheet 5, and will hereafter be referred to as the first image signal SO1. The first image signal SO1 is stored in an internal memory of the image processing and displaying apparatus 30.

The image processing and displaying apparatus 30 is provided with a keyboard 31, from which various instructions are entered, and a CRT display device 32, which displays auxiliary information for instructions and a visible image represented by an image signal. The image processing and displaying apparatus 30 is also provided with a floppy disk drive unit 33, which receives and operates a floppy disk serving as an auxiliary storage medium, and a main body 34 which incorporates a CPU and the internal memory.

Thereafter, in the same manner as that described above, a second image signal SO2 is obtained which represents the second radiation image stored on the second stimulable phosphor sheet 7. The second image signal SO2 is stored in the internal memory of the image processing and displaying apparatus 30.

In the manner described above, the two image signals SO1 and SO2 to be subjected to the subtraction processing are stored in the internal memory of the image processing and displaying apparatus 30. Thereafter, the two image signals SO1 and SO2 are read from the internal memory and processed for the adjustment of the positions of the two radiation images such that the image signal components of the two image signals SO1 and SO2, which represent corresponding picture elements in the radiation images, may be subtracted from each other.

How the positions of the two radiation images represented by the image signals SO1 and SO2 are adjusted in this embodiment will be described hereinbelow.

Figure 4:
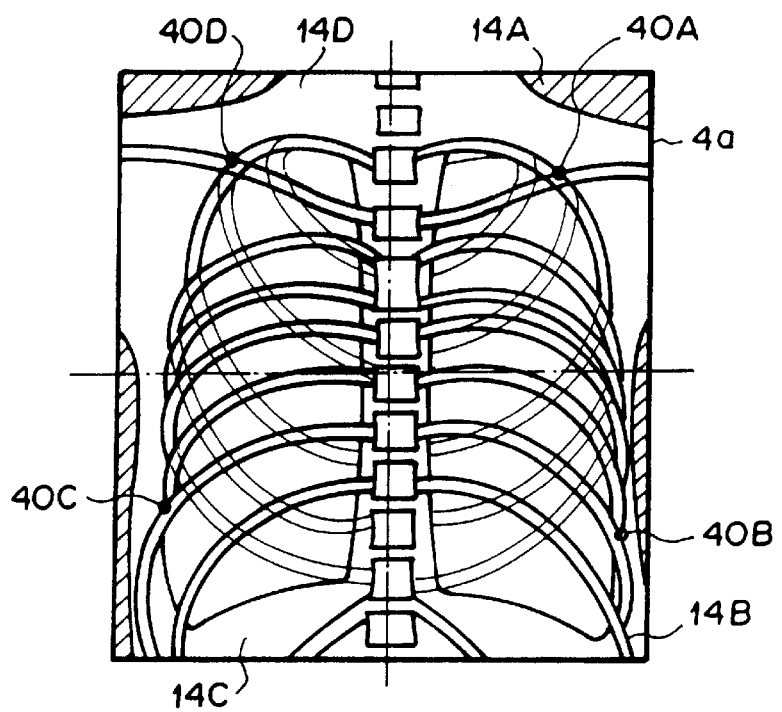
FIG. 4 is an explanatory view showing how reference corresponding points are set in a radiation image.

In the embodiment of the method for adjusting positions of radiation images in accordance with the present invention, as illustrated in FIG. 4, the radiation image 4a obtained with the stimulable phosphor sheet 5, which was located at the position close to the radiation source 2 in the radiation image recording apparatus shown in FIG. 1, is divided into four equal regions. In this manner, four regions 14A, 14B, 14C, and 14D are determined. Thereafter, each region of the image is subjected to filtering processing using a cross type of filter, and a point, which gives the maximum value of the output of the filter, is thereby detected.

If the matrix of the filter is Aij (where i=1, 2, . . . , n, j=1, 2, . . . , n), the filter is represented by the formula shown below.

$$Aij = \begin{vmatrix} a_{1,1} & \cdots & a_{1,n} \\ \vdots & \ddots & \vdots \\ a_{n,1} & \cdots & a_{n,n} \end{vmatrix} \quad (1)$$

The term "cross type of filter" as used herein means a matrix such that a≠b (a>b) when the element a=Ai,j (where i=j or i=n−j−1) and the element b=Ai,j (where i≠j and i≠n−j−1). In this embodiment, for example, the matrix shown below is used.

$$Hij = \begin{vmatrix} 1.6 & -0.9 & -0.9 & -0.9 & 1.6 \\ -0.9 & 1.6 & -0.9 & 1.6 & -0.9 \\ -0.9 & -0.9 & 1.6 & -0.9 & -0.9 \\ -0.9 & 1.6 & -0.9 & 1.6 & -0.9 \\ 1.6 & -0.9 & -0.9 & -0.9 & 1.6 \end{vmatrix} \quad (2)$$

In cases where the cross type of filter described above is used, as illustrated in FIG. 4, it becomes possible to detect a part having a complicated structure, such as a cross edge at which ribs intersect each other, i.e. a point at which the density changes markedly from the density of the surrounding regions. In this embodiment, four points 40A, 40B, 40C, and 40D can be detected. In each of the regions 14A, 14B, 14C, and 14D, a plurality of such cross edges are present. In this embodiment, the points 40A, 40B, 40C, and 40D, at which the output of the filter takes the maximum value, are respectively detected in the regions 14A, 14B, 14C, and 14D.

Figure 5:
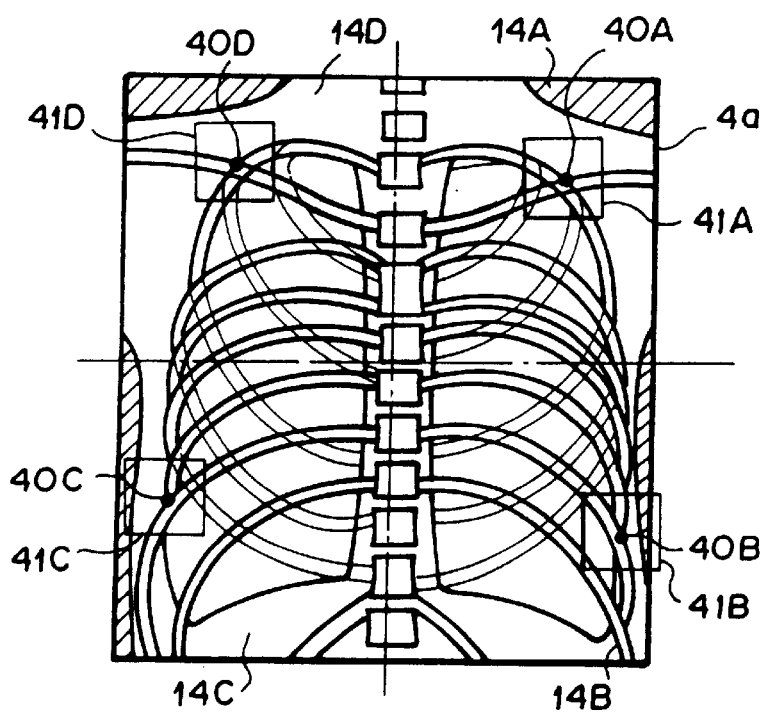
FIG. 5 is an explanatory view showing how template regions are set in the radiation image.

The four points 40A, 40B, 40C, and 40D are detected in the manner described above. Thereafter, a template region having its center at each of the points 40A, 40B, 40C, and 40D is set on the radiation image 4a. Specifically, as illustrated in FIG. 5, template regions 41A, 41B, 41C, and 41D respectively having their centers at the points 40A, 40B, 40C, and 40D are set in the four equally divided regions 14A, 14B, 14C, and 14D.

Thereafter, template matching is carried out by moving each of the template regions 41A, 41B, 41C, and 41D within a predetermined range on the radiation image 4b. The template matching is carried out in the manner described above by using the correlation method or the SSDA method. As described above, in cases where the correlation method is employed, the point associated with the maximum normalized value gives the coordinates of each of the corresponding points, which will be described below. Also, as described above in cases where the SSDA method is employed, the point associated with the minimum residual gives the coordinates of each of the corresponding points.

The template matching is carried out in the manner described above. As illustrated in FIG. 6, four corresponding points 44A, 44B, 44C, and 44D are thereby obtained respectively for four regions 43A, 43B, 43C, and 43D of the radiation image 4b.

Thereafter, the points 40A, 40B, 40C, and 40D on the radiation image 4a are taken as reference corresponding points. Also, the coordinates of the reference corresponding points are expressed as (ui, vi), where i=1, 2, 3, 4. The coordinates (xi, yi) of each corresponding point on the radiation image 4b are then transformed with affine transformation, which is represented by Formula (3)

$$\begin{pmatrix} ui \\ vi \end{pmatrix} = m \begin{pmatrix} \cos\theta & -\sin\theta \\ \sin\theta & \cos\theta \end{pmatrix} \begin{pmatrix} xi \\ yi \end{pmatrix} + \begin{pmatrix} C \\ D \end{pmatrix} \quad (3)$$

$$= \begin{pmatrix} A & -B \\ B & A \end{pmatrix} \begin{pmatrix} xi \\ yi \end{pmatrix} + \begin{pmatrix} C \\ D \end{pmatrix}$$

where m represents the enlargement or reduction factor, θ represents the amount of rotation, A and B are the factors representing correction with a rotating operation and correction with the enlargement or reduction factor, and C and D are the factors representing correction with parallel translation. In this manner, the first radiation image 4a and the second radiation image 4b are superposed one upon the other. With the coordinate transformation, which is carried out in accordance with Formula (3), the enlargement or reduction of the entire area of the second radiation image 4b in each of the X and Y directions, the rotating operation of the entire area of the second radiation image 4b, and the parallel translation of the second radiation image 4b in the X and Y directions are carried out simultaneously.

How the factors A, B, C, and D contained in Formula (3) are calculated will be described hereinbelow.

In the method for adjusting positions of radiation images in accordance with the present invention, the factors A, B, C, and D are calculated with the method of least squares. First, the error E between the position of the reference corresponding point having the coordinates (ui, vi) and the corresponding point having the coordinates (xi, yi) is represented by Formula (4).

$$E = \sum (u - ui)^2 + \sum (v - vi)^2 \quad (4)$$
$$= \sum (A \cdot xi - B \cdot yi + C - ui)^2 +$$
$$\sum (B \cdot xi + A \cdot yi + D - vi)^2$$

Such that the square error of the error E may become minimum, solving Formula (4) yields $$\frac{\partial E}{\partial A} = \frac{\partial E}{\partial B} = \frac{\partial E}{\partial C} = \frac{\partial E}{\partial D} = 0 \quad (5)$$

Therefore, when the linear equation is solved from Formula (5), the factors A, B, C, and D are calculated as shown below.

$$A = [d \cdot (e+f) - b \cdot i - c \cdot j]/\Delta$$

$$B = [d \cdot (g+h) + c \cdot i - b \cdot j]/\Delta$$

$$C = [-b \cdot (e+f) + c \cdot (-g+h) + a \cdot i]/\Delta$$

$$D = [-c \cdot (e+f) - b \cdot (-g+h) + a \cdot j]/\Delta$$

where $\Delta = a \cdot d - b^2 - c^2$ $a = \Sigma(xi^2 + yi^2)$, $b = \Sigma xi$, $c = \Sigma yi$, $d = \Sigma$ $e = \Sigma xi \cdot ui$, $f = \Sigma yi \cdot vi$ $g = \Sigma yi \cdot ui$, $h = \Sigma xi \cdot vi$, $i = \Sigma ui$, $j = \Sigma vi$ \quad (6)

Figure 7:
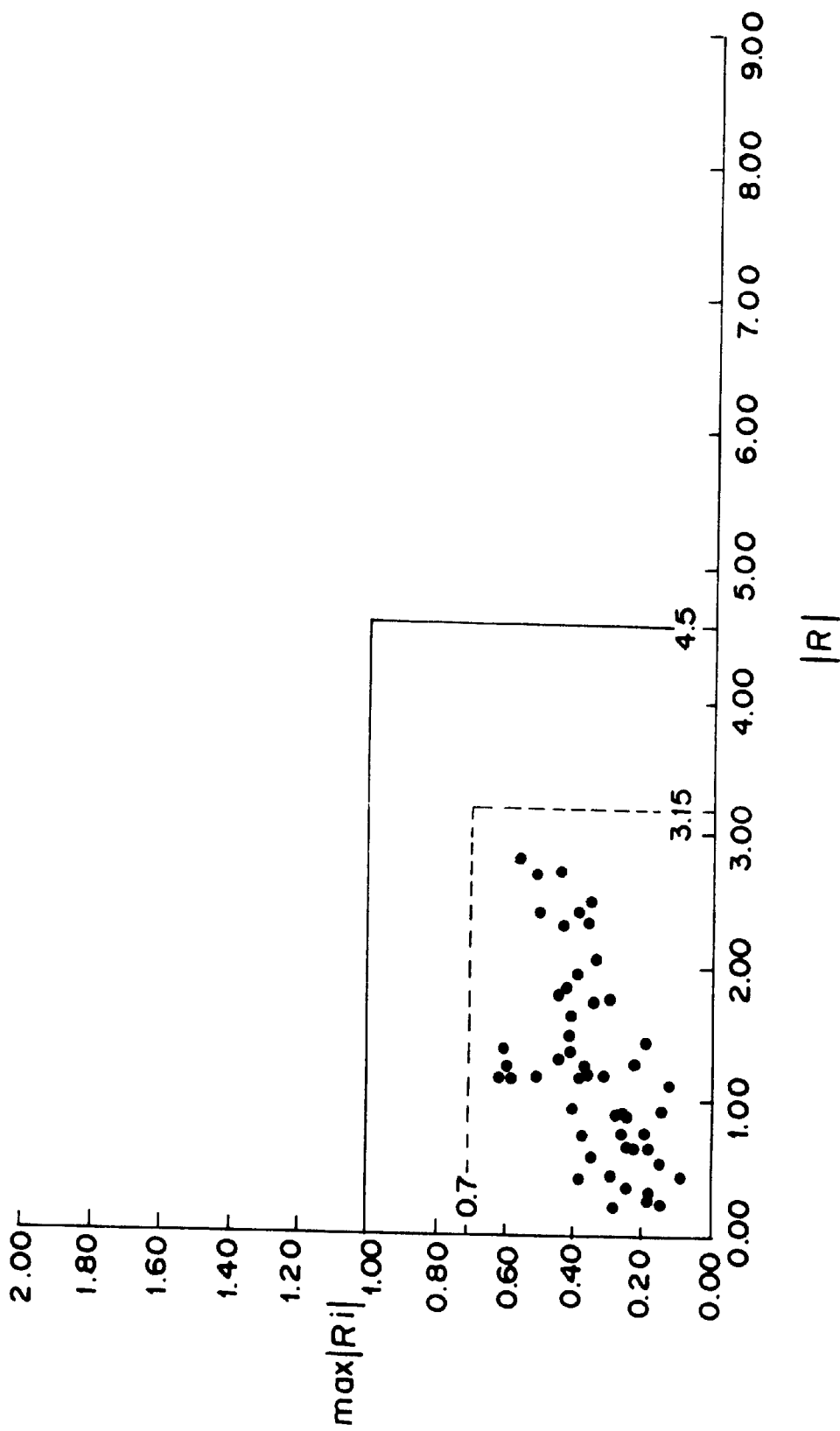
FIG. 7 is a graph showing the results of position adjustments carried out with the method for adjusting positions of radiation images in accordance with the present invention.
Figure 8:
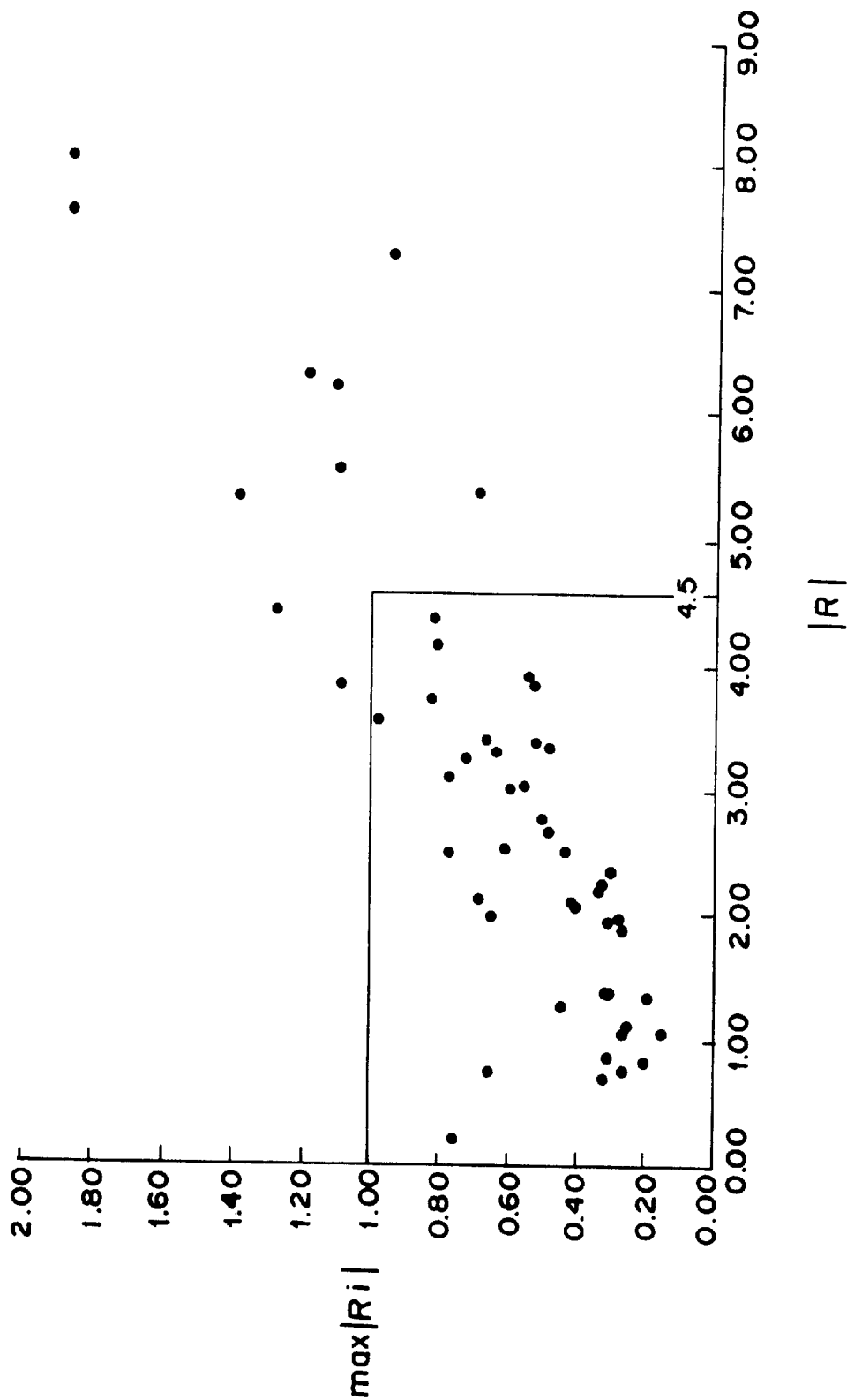
FIG. 8 is a graph showing the results of position adjustments carried out with a conventional method for adjusting positions of radiation images.

The coordinate transformation is carried out with Formula (3) by using the factors A, B, C, and D, which have been calculated in the manner described above. In this manner, the position of the second radiation image 4b can be approximately matched with the position of the first radiation image 4a such that the error between each of the corresponding points 44A, 44B, 44C, and 44D and each of the reference corresponding points 40A, 40B, 40C, and 40D may become minimum. FIG. 7 shows the results of position adjustments carried out on 55 sets of radiation images with the method for adjusting positions of radiation images in accordance with the present invention. Specifically, as illustrated in FIG. 7, in cases where the reference level is taken as |R|=4.5 and max|Ri|=1.00, the results of the position adjustments on all of the 55 sets of the radiation images fall within the range of the reference level. More specifically, the results of the position adjustments on all of the 55 sets of the radiation images fall within the range of |R|=3.15 and max|Ri|=0.7. From the results shown in FIG. 7, it can be found that, with the method for adjusting positions of radiation images in accordance with the present invention, the position adjustment can be carried out far more accurately than with the conventional method, the results of which are shown in FIG. 8.

After the affine transformation has been carried out in the manner described above, subtraction processing is carried out. Specifically, in cases where an image signal SO2' is obtained from the position adjustment carried out on the image signal SO2, the image signal SO1 and the image signal SO2' are weighted and subtracted from each other in accordance with Formula (7)

$$S1 = Wa \cdot SO1 - Wb \cdot SO2' + C \tag{7}$$

where Wa and Wb represent the weight factors, and C represents the bias component. In this manner, an image signal S1, which represents an image of the difference between the two radiation images, is obtained. The image signal S1 is fed into the CRT display device 32 of the image processing and displaying apparatus 30. A visible image (i.e., an energy subtraction image) is thus reproduced from the image signal S1 on the CRT display device 32. The function (i.e., the combination of the hardware and software functions) for carrying out the subtraction processing in the main body 34 constitutes an example of the operation unit for carrying out the method for adjusting positions of radiation images in accordance with the present invention.

In the embodiment described above, the corresponding points are detected with the template matching from the radiation image 4b, which is obtained from the stimulable phosphor sheet 7 located at the position remoter from the radiation source 2 in the radiation image recording apparatus shown in FIG. 1. The corresponding points are then subjected to the affine transformation. The reasons for the above will be described hereinbelow. Specifically, in cases where the radiation images are recorded on the two stimulable phosphor sheets 5 and 7 with the one-shot image recording operation as shown in FIG. 1, the two stimulable phosphor sheets 5 and 7 are located at spatially different positions with the filter 6 intervening therebetween. Therefore, the distances from the radiation source 2 to the two stimulable phosphor sheets become different from each other. Also, the distances from the object 4 to the two stimulable phosphor sheets become different from each other. As a result, the sizes of the radiation images recorded on the stimulable phosphor sheets 5 and 7 become different from each other. Also, the radiation image 4b stored on the stimulable phosphor sheet 7, which is located at the position remoter from the radiation source 2 than is the stimulable phosphor sheet 5, becomes more unsharp and contains more effects of scattered radiation than the radiation image 4a stored on the stimulable phosphor sheet 5. Further, in cases where the affine transformation described above is carried out, the image quality of the transformed radiation image becomes bad to some extent due to interpolation of image signal components from the image signal components representing picture elements. Accordingly, such that the subtraction image having better image quality can be obtained, instead of the radiation image 4a having good image quality being subjected to affine transformation, which renders the image quality bad, the radiation image 4b having worse image quality than the image quality of the radiation image 4a should preferably be subjected to affine transformation. For reasons described above, in this embodiment, the radiation image 4b obtained with the stimulable phosphor sheet 7, which is located at the position remoter from the radiation source 2 than is the stimulable phosphor sheet 5, is subjected to the affine transformation.

Also, in the embodiment described above, the affine transformation is carried out by setting the four corresponding points 44A, 44B, 44C, and 44D on the radiation image 4b. However, the number of the corresponding points is not limited to four and may be three or more. When more corresponding points are set, the accuracy of the position adjustment can be kept higher. However, if the number of the corresponding points is large, a longer time will be required to carry out the operation. Therefore, the number of the corresponding points should preferably be selected appropriately by considering the required level of the accuracy of the position adjustment and the required operation time.

Figure 9:
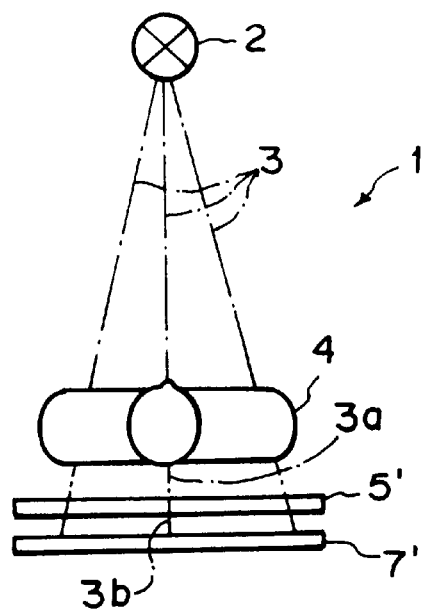
FIG. 9 is a schematic view showing a radiation image recording apparatus for obtaining radiation images to be subjected to superposition processing.
Figure 10:
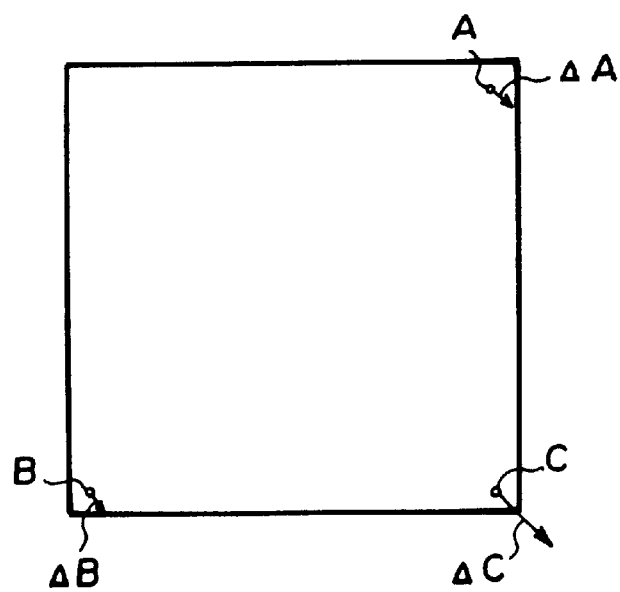
FIG. 10 is an explanatory view showing a shift of a radiation image.

Further, in the embodiment described above, the positions of the two radiation images are adjusted in order to carry out the energy subtraction processing. Alternatively, the positions of the two radiation images may be adjusted in order to carry out superposition processing. Specifically, as illustrated in FIG. 9, the filter 6 is omitted in the radiation image recording apparatus 1 of the same type as that shown in FIG. 1, and radiation images of the object 4 are thereby recorded on two stimulable phosphor sheets 5' and 7'. Thereafter, image signals SO1 and SO2 representing the recorded radiation images are obtained from the stimulable phosphor sheets 5' and 7' by using the radiation image read-out apparatus shown in FIG. 3. Of the radiation images obtained with the two stimulable phosphor sheets 5' and 7', the radiation image obtained with the stimulable phosphor sheet 7' is subjected to the affine transformation in the same manner as that in the aforesaid embodiment, and the position adjustment is thereby carried out. Thereafter, the superposition processing is carried out. Specifically, in cases where an image signal SO2' is obtained from the position adjustment carried out on the image signal SO2, the image signal SO1 and the image signal SO2' are weighted and added to each other in accordance with Formula (8)

$$S2 = Wc \cdot SO1 + Wd \cdot SO2' \tag{8}$$

where Wc and Wd represent the weight factors. In this manner, an image signal S2, which represents an image of the sum of the two radiation images, is obtained.

Furthermore, in the embodiment described above, the radiation image is subjected to the filtering processing using the cross type of filter, and the point, which gives the maximum value of the output of the filter, is thereby detected. Alternatively, for example, the point associated with the maximum value in each of the divided regions, the point associated with a value not smaller than a certain predetermined value in each of the divided regions, or the like, may be detected.

Also, in the embodiment described above, the positions of the two radiation images are adjusted. However, the number of the radiation images, the positions of which are to be adjusted with one another, may be three or larger. In such cases, the reference corresponding points may be set in one of the three or more radiation images, and the template matching may then be carried out on the other radiation images in order to set the corresponding points in each of the other radiation images. The corresponding points in each of the other radiation images may then be matched with the reference corresponding points by carrying out the affine transformation.

Further, in the embodiment described above, the adjustment of the positions of the radiation images is carried out with the affine transformation represented by Formula (3). However, in the method for adjusting positions of radiation images in accordance with the present invention, the position adjustment may be carried out with the affine transformation using any of other factors, which is represented by the general formula $$\begin{pmatrix} u \\ v \end{pmatrix} = \begin{pmatrix} a & b \\ c & d \end{pmatrix} \begin{pmatrix} x \\ y \end{pmatrix} + \begin{pmatrix} e \\ f \end{pmatrix}$$

wherein u and v represent the coordinates of the reference corresponding point, x and y represents the coordinates of the corresponding point to be transformed, a, b, c, and d are the factors representing correction with a rotating operation and correction with an enlargement or reduction factor, and e and f are the factors representing correction with parallel translation.

What is claimed is:

1. A method for adjusting positions of radiation images, wherein the positions of a plurality of radiation images are matched to one another such that the radiation images may be subjected to superposition processing or subtraction processing, the method comprising the steps of:

i) setting template regions on a single radiation image, which is among the plurality of the radiation images, ii) carrying out template matching, with which said template regions are matched with the radiation images other than said single radiation image, iii) thereby obtaining at least three corresponding points in each of the plurality of the radiation images, iv) taking the corresponding points in a single radiation image, which is among the plurality of the radiation images, as reference corresponding points, v) calculating factors of affine transformation with the method of least squares, said affine transformation being represented by the formula:

$$\begin{pmatrix} u \\ v \end{pmatrix} = \begin{pmatrix} a & b \\ c & d \end{pmatrix} \begin{pmatrix} x \\ y \end{pmatrix} + \begin{pmatrix} e \\ f \end{pmatrix}$$

wherein u and v represent the coordinates of the reference corresponding point, x and y represent the coordinates of the corresponding point to be transformed, a, b, c, and d are the factors representing correction with a rotating operation and correction with an enlargement or reduction factor, and e and f are the factors representing correction with parallel translation, and vi) carrying out affine transformation, in which the calculated factors of affine transformation are used, and with which the values of coordinates of the corresponding points in the radiation images other than said single radiation image having the reference corresponding points are transformed into values of coordinates of the reference corresponding points such that the reference corresponding points and the transformed corresponding points in the radiation images other than said single radiation image having the reference corresponding points may coincide with one another;

wherein said affine transformation step is performed so that each of enlargement or reduction, rotation, and parallel translation of the radiation images, other than said single radiation image, occur simultaneously; and wherein the plurality of the radiation images are recorded with a radiation source and a one-shot image recording operation, and the reference corresponding points are set in the radiation image which has been obtained at the position closest to the radiation source.

2. A method as defined in claim 1, wherein the template matching is carried out with a correlation method.

3. A method as defined in claim 1, wherein the template matching is carried out with sequential similarity detection algorithms.

4. A method as defined in claim 1, wherein before the template setting step i) is performed, said method performs a step of dividing said single radiation image into a plurality of regions, and selecting a point in each of said regions by a cross-type filtering processing of the regions, said point in each of said regions is a point which gives a maximum output of said cross-type filtering processing performed in its respective region, and wherein said point in each of the regions correspond to said at least three corresponding points, respectively.

5. A method as defined in claim 1, wherein the method is performed without the use of a marker.

* * * * *